UNITED STATES PATENT OFFICE.

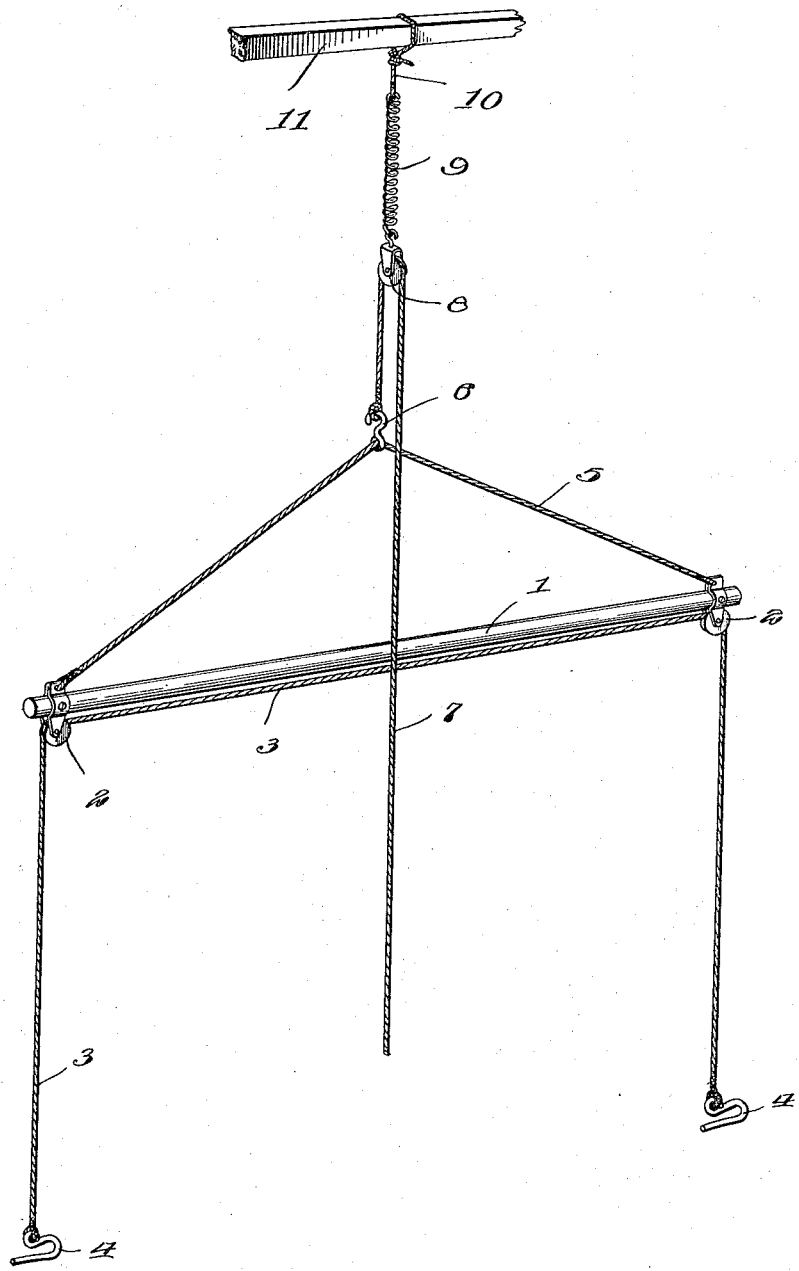

WILLIAM E. CONVERSE, OF FRANKTOWN, COLORADO.

SICKLE-HOLDER.

1,149,116.  Specification of Letters Patent.  Patented Aug. 3, 1915.

Application filed September 16, 1914. Serial No. 862,076.

*To all whom it may concern:*

Be it known that I, WILLIAM E. CONVERSE, a citizen of the United States, residing at Franktown, in the county of Douglas and State of Colorado, have invented new and useful Improvements in Sickle-Holders, of which the following is a specification.

This invention relates to sickle holders or holders for the knives of sickles, mowing machines and the like while grinding the same, the object in view being to provide a holder of the class described which will yieldingly support the greater portion of the weight of the knife or knife bar and also equalize the balance thereof for the purpose of facilitating the grinding of the knife or knife bar throughout the entire length thereof.

With the above and other objects in view, the invention consists in the novel construction, combination and arrangement of parts, as herein described, illustrated and claimed.

The accompanying drawing represents a perspective view of the holder of this invention.

The sickle bar holder contemplated in this invention comprises a suspension spreader bar 1 having attached to the opposite ends thereof pulleys 2 around which passes a flexible element 3 such as a rope or cable provided at its two extremities with U-shaped clips 4 adapted to embrace a sickle or sickle bar at distantly located points for the purpose of suspending the knife in position to be sharpened by the operator.

The spreader or suspension bar 1 has connected thereto a supporting bridle 5 having a central hook 6 to which is fastened one end of a raising and lowering rope or cable 7, the latter passing over a pulley 8 which is attached to the lower end of a helical spring 9. The opposite end of this spring is fastened to the lower extremity of a suspension rope or cable 10 adapted to be fastened at its upper end to an overhead support such as the rafter of a building, the limb of a tree or in fact any elevated support.

By means of the rope or cable 7, the knife or sickle bar may be raised and lowered until it is brought into the desired position to be ground, the knife being supported by means of the clips 4. Any suitable sharpening device may be employed for bringing the knife or sickle bar to a cutting edge, the rope or cable 3 running over the pulleys 2 so that the operator may change the angle of the knife or sickle bar to suit his convenience according to the portion of the knife or sickle bar being sharpened.

What I claim is:—

A holder for the purpose specified, comprising a spreader bar, raising and lowering means therefor, pulleys connected to said spreader bar in spaced relation to each other, and a flexible element passing over said pulleys and provided at the extremities thereof with clips for engaging and supporting the work, said raising and lowering means including a helical spring.

In testimony whereof I affix my signature in presence of two witnesses.

WILLIAM E. CONVERSE.

Witnesses:
S. B. GOODDING,
L. L. HUNTER.

Copies of this patent may be obtained for five cents each, by addressing the "Commissioner of Patents, Washington, D. C."